UNITED STATES PATENT OFFICE.

JOHN C. KESSLER, OF MILWAUKEE, WISCONSIN.

INSECT-REPELLENT.

SPECIFICATION forming part of Letters Patent No. 708,649, dated September 9, 1902.

Application filed September 8, 1899. Serial No. 729,803. (No specimens.)

*To all whom it may concern:*

Be it known that I, JOHN C. KESSLER, a citizen of the United States, residing at Milwaukee, in the county of Milwaukee and State of Wisconsin, have invented a new and useful Composition of Matter to be Used for Repelling Flies and other Insects, of which the following is a specification.

My compound consists of a preparation of fat acids of cocoanut-oil with a solvent, such as a mixture of amyl acetate and alcohol, all preferably combined with a small quantity of sassafras-oil, the proportions of the various elements of my compound best adapted for the purpose being substantially as follows, to wit: fat acids of cocoanut-oil, four (4) pounds; amyl acetate, (commercial,) four (4) pounds; alcohol, (wood-alcohol,) two pounds; sassafras-oil, one-half ($\frac{1}{2}$) ounce. To procure the first ingredient—fat acid of cocoanut-oil—I saponify a quantity of cocoanut-oil and then decompose the same with an inorganic acid, such as muriatic acid or sulfuric acid, when the fat acids will be separated in a condition for use. The so-called "volatile" acids—viz., capric, caproic, and caprylic acids—are the most active agents of my compound, being all possessed of pungent characteristics repulsive to taste and smell, and especially repulsive to insects. The non-volatile lauric acid is also present, with a small quantity of myristic and palmitic acids. These non-volatile acids, while not absolutely essential to the compound, are of service in preventing the rapid dissipation of the volatile acids, and it will also be found that the lauric acid is effective in repelling insects to some extent. When prepared with the amyl acetate and alcohol, the preparation is in liquid form and may be applied to the animal by means of a sponge or in any other convenient manner. I do not, however, limit my claims to the use of any special form of solvent, although it will be found desirable to use the amyl acetate and alcohol, as the combination of these two ingredients will effectually hold the acids in solution and will not evaporate too rapidly.

It will of course be understood that the essential ingredients of my compound may be prepared either in the form of a liquid or in the form of a salve or paste, according to the quality of the solvent. I do not, however, claim a composition composed of any of the fat acids of cocoanut-oil, considered separately from the other fat acids, secured by the decomposition of the cocoanut-oil, as above explained, for while it will be understood that any of the acids of the capric group or the lauric acid found in cocoanut-oil is repulsive to flies and other insects, yet their separate production is necessarily so expensive as to prohibit their use for such purposes. My invention, however, resides particularly in the discovery that by decomposing cocoanut-oil a group of fat acids may be secured, all of which are repulsive to flies, insects, and parasites generally, which acids in their combined state can be thus secured in such quantity and at such small expense as to make them available for the described purpose.

Having thus described my invention, what I claim as new, and desire to secure by Letters Patent, is—

1. A composition of matter, consisting of fat acids of cocoanut-oil, combined with a suitable solvent, and sassafras-oil.

2. A composition of matter consisting of a solution of fat acids of cocoanut-oil, in amyl acetate, and alcohol.

3. A composition of matter consisting of a solution of fat acids of cocoanut-oil, in amyl acetate, and alcohol, and sassafras-oil.

4. A composition of matter, consisting in the combined fat acids of cocoanut-oil, in combination with a suitable solvent and sufficiently liquefied thereby to be readily distributed upon the hair or skin of an animal, substantially for the purpose set forth.

In testimony whereof I have hereunto set my hand and seal this 5th day of September, 1899.

JOHN C. KESSLER. [L. S.]

Witnesses:
OTTO H. KESSLER,
LEVERETT C. WHEELER.